US 11,449,795 B2

(12) United States Patent
Muthusamy et al.

(10) Patent No.: US 11,449,795 B2
(45) Date of Patent: Sep. 20, 2022

(54) PROCESS SPEED-BASED FORECASTING

(71) Applicant: CANVASS ANALYTICS INC., Toronto (CA)

(72) Inventors: Venkatesh Muthusamy, Toronto (CA); Mingjie Mai, Toronto (CA); Steve Kludt, Toronto (CA)

(73) Assignee: CANVASS ANALYTICS INC., Toronto (CA)

(*) Notice: Subject to any disclaimer, the term of this patent is extended or adjusted under 35 U.S.C. 154(b) by 583 days.

(21) Appl. No.: 16/555,098

(22) Filed: Aug. 29, 2019

(65) Prior Publication Data

US 2021/0065044 A1    Mar. 4, 2021

(51) Int. Cl.
  *G06N 5/02*    (2006.01)
  *G06F 9/54*    (2006.01)
  *G06N 20/00*    (2019.01)
  *G06N 5/04*    (2006.01)

(52) U.S. Cl.
  CPC .............. *G06N 20/00* (2019.01); *G06N 5/02* (2013.01); *G06N 5/04* (2013.01)

(58) Field of Classification Search
  CPC ................................. G06N 20/00; G06N 5/02
  USPC ........................................................ 706/12
  See application file for complete search history.

(56) References Cited

U.S. PATENT DOCUMENTS

| | | | |
|---|---|---|---|
| 6,618,638 B1 | 9/2003 | Vahedi et al. | |
| 7,783,455 B1 | 8/2010 | Coss, Jr. | |
| 10,783,433 B1* | 9/2020 | Proshin | G06N 3/08 |
| 11,294,367 B2* | 4/2022 | Kludt | G06N 3/084 |
| 2003/0018683 A1 | 1/2003 | Nara et al. | |
| 2003/0083757 A1 | 5/2003 | Card et al. | |
| 2003/0220740 A1* | 11/2003 | Intriligator | G01W 1/10 702/3 |
| 2006/0025877 A1 | 2/2006 | Watanabe et al. | |
| 2011/0297190 A1 | 12/2011 | Atshushi | |
| 2014/0046983 A1* | 2/2014 | Galloway | G06F 21/6218 707/798 |
| 2014/0082637 A1 | 3/2014 | Suzuki et al. | |
| 2014/0157286 A1 | 6/2014 | Brazier | |
| 2015/0151405 A1 | 6/2015 | Maeguchi et al. | |
| 2015/0199495 A1 | 7/2015 | Solvason | |
| 2020/0103858 A1* | 4/2020 | SayyarRodsari | G05B 19/4183 |
| 2020/0103878 A1* | 4/2020 | SayyarRodsari | G05B 19/41885 |
| 2020/0103888 A1* | 4/2020 | Sayyarrodsari | G05B 19/41845 |
| 2020/0201313 A1* | 6/2020 | Kludt | G05B 13/048 |
| 2021/0056413 A1* | 2/2021 | Cheung | G06N 3/0454 |

* cited by examiner

*Primary Examiner* — Hamza N Algibhah
(74) *Attorney, Agent, or Firm* — Jenna L. Wilson; Wilson Lue LLP (57) ABSTRACT

Methods and systems for process speed-based forecasting, in which historical data of a process is first aligned to account for latency in the process. Optionally, incorporation of memory and/or clustering can be included in the pre-processing of the historical data before being used to train a machine learning model.

18 Claims, 7 Drawing Sheets

PROCESS SPEED-BASED FORECASTING

BACKGROUND

In a slab casting process, molten metal is the raw material that is shaped through a mold and a set of rollers while it is being cooled and solidified into a slab. Several process variables are collected at a series of time points for this process. Examples of process variables include metal flow rate, throughput rate of the process (i.e. length of slab produced/unit time), ambient conditions (e.g. temperature) and metrics relating to inputs and outputs of the process (e.g. quality, weight of material). In the case of a slab casting process, slab width is one of the quality metrics, which if forecasted, may be useful to control the process to avoid manufacturing an out-of-complaint slab. For a given time series of data, machine learning can be applied to forecast some of the output variable (or "target"). However, to apply forecasting techniques to time-series data especially in an industrial process a number of challenges need to be addressed, a few of which are described below.

There is always a latency in industrial processes—from the point of feeding raw materials as process input to the finished product as output. Since, the data is collected across the entire length of the material flow in the process at each instance of time, variables measured at a time point $t_i$ (i.e. $Xt_i$) at a specific location in the process do not relate directly to the target at time point $t_i$ (i.e. $y_{ti}$). Instead, variables measured at a time $t_i$ relate to the target at a later time (or latency). For example, the temperature at a time $t_i$, measured at the beginning of the process, is not directly related to the temperature at the end of the process at that same time $t_i$. Instead, the temperature at the beginning of the process will have an effect in the end of the process at some later time point, $t_{i+latency}$ (i.e. after a latency).

In addition, the process variables are not only affected by the current state of the process, but also by previous states which needs to be considered while modelling to predict a target variable. For example, the temperature measured at time $t_i$ depends on the temperature at the previous time points $t_{i-1}$, $t_{i-2}$, etc. Hence machine learning for this type of problems would not be traditional $X_{ti}$ to $Y_{ti}$ mapping.

Furthermore, industrial processes often have several process variations based on, for example, human actions, environmental conditions or changes in the raw material. It is challenging for a single machine learning model to learn and generalize all the variations of the process for predicting a target variable.

Finally, the speed or rate of the process changes during the casting process, making predictions based solely on time very difficult.

BRIEF SUMMARY

In one aspect, there is provided a method comprising: obtaining historical data of a process, the historical data comprising: one or more process variables; a process speed; and a target variable; pre-processing the historical data to provide a pre-processed data set, the pre-processing comprising aligning the target variable to the one or more process variables to provide an aligned dataset; and training a machine learning model on the pre-processed dataset.

In another aspect, there is provided a computing system, the computing system comprising: a processor; and a computer memory storing instructions that, when executed by the processor, configure the system to: obtain historical data of a process, the historical data comprising: one or more process variables; a process speed; and a target variable; pre-process the historical data to provide a pre-processed data set, the pre-processing comprising aligning the target variable to the one or more process variables to provide an aligned dataset; and train a machine learning model on the pre-processed dataset.

In yet another aspect, there is provided a non-transitory computer-readable storage medium, the computer-readable storage medium including instructions that when executed by a computer, cause the computer to: obtain historical data of a process, the historical data comprising: one or more process variables; a process speed; and a target variable; pre-process the historical data to provide a pre-processed data set, the pre-processing comprising aligning the target variable to the one or more process variables to provide an aligned dataset; and train a machine learning model on the pre-processed dataset.

In some embodiments, aligning the target variable is based on: a resolution factor for the process speed, a distance of the process and the process speed.

In some embodiments, after aligning the target variable, pre-processing further comprises at least one of: incorporating a memory of one or more selected features of the process into the pre-processed data set; and partitioning the aligned dataset into a plurality of sub-datasets, wherein a separate machine learning model is trained on each sub-dataset of the plurality of sub-datasets; and wherein if incorporating memory and partition are performed: the aligned dataset first incorporates memory and is then partitioned into sub-datasets; or each sub-dataset incorporates the memory of one more selected features. A clustering algorithm can be used to partition the dataset into clusters of sub-datasets. The memory can include a plurality of memory steps; and the memory steps and selected features may be determined by domain knowledge or a correlation analysis between the target variable and features at different timesteps.

In some embodiments, a rule-based method can be used to partition the dataset into sub-datasets, the rule-based method derived from domain knowledge.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Like reference numbers and designations in the various drawings indicate like elements.

Figure 1:
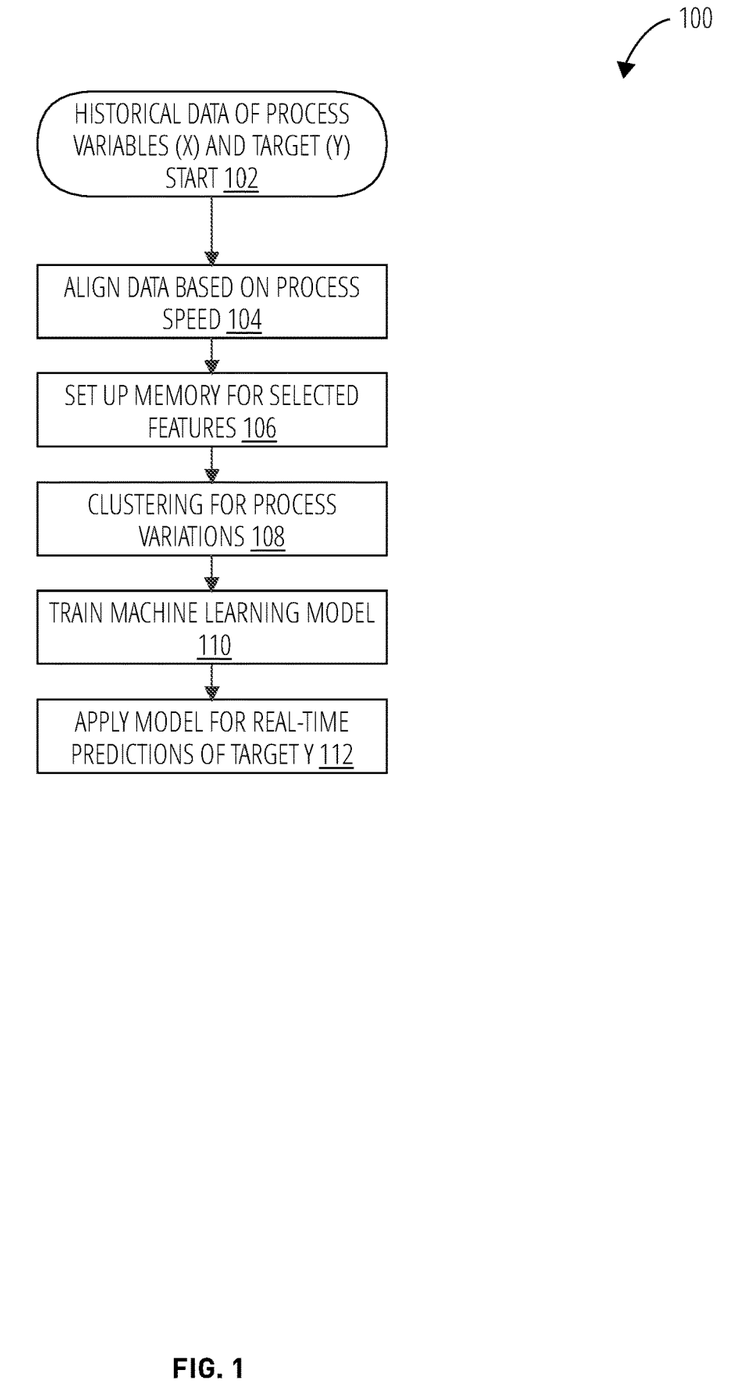
FIG. 1 illustrates a process in accordance with one embodiment.

FIG. 1 illustrates a process 100 in accordance with one embodiment. Historical data of process variables ($Xt_1$, $Xt_2$, $Xt_3$, . . . ), denoted simply as 'X', where each of the $X_{ti}$ represents the list of process variables collected at time i, and the targets ($y_{t1}$, $y_{t2}$, $y_{t3}$, . . . ), denoted as 'Y', are collected. The terms $t_1$, $t_2$, . . . represent time intervals at which observations are collected. The intervals can be regular or irregular. In some embodiments, the time intervals can be every 500 milliseconds, or every second, or more or less.

At 104, process variables X and target Y are aligned in such a manner as to incorporate latency. At 106, memory of certain features is set up to ensure that the model understands the previous states of the process. At 108, clustering for process variations is performed to separate data into individual sets for each variation. Steps 104 and 106 are based on domain information of the industrial process, while step 108 uses unsupervised machine learning for the clustering process. Clustering for process variations and/or memory step 106 can be an optional step, based on the accuracy of the final results.

Following these steps that prepare the data, the machine learning model is trained at 110. The trained model is then ready to use for real-time prediction of target Y, at 112.

Each pre-condition step is further discussed below.

Alignment of Target with Process Variables

A method, in some embodiments, to align a target (Y) with respect to the process variables (X) based on the latency of the process:

$$X_{t_i} \rightarrow y_{t_{i+latency}}$$

is described as follows.

As an example, Table 1 is a collection of the raw data:

TABLE 1

| Time | $x_1$ | $x_2$ | . . . | $x_n$ (Process Speed) | y |
|---|---|---|---|---|---|
| $t_1$ | 0.10 | −0.31 | . . . | 0.02 | 1.1 |
| $t_2$ | 0.22 | 0.20 | . . . | 0.01 | 1.2 |
| $t_3$ | 0.10 | −0.31 | | 0.02 | 0.8 |
| $t_4$ | 0.22 | 0.20 | | 0.02 | 0.7 |
| $t_5$ | 0.10 | −0.31 | | 0.01 | 0.2 |
| $t_6$ | 0.22 | 0.20 | | 0.01 | 0.0 |

TABLE 1-continued

| Time | $x_1$ | $x_2$ | . . . | $x_n$ (Process Speed) | y |
|---|---|---|---|---|---|
| $t_7$ | 0.10 | −0.31 | | 0.01 | −0.5 |
| $t_8$ | 0.22 | 0.20 | | 0.02 | −1.0 |
| . . . | . . . | . . . | . . . | . . . | . . . |
| $t_m$ | 0.22 | 0.20 | . . . | . . . | 0.4 |

Process latency depends on the process speed ($x_n$), which is a process variable that is measured; the distance between the beginning and the end of the process (D), which is usually a constant. The unit of $x_n$ is represented in terms of length/time (for example, meters/sec), while the unit of D is represented in terms of length (for example, meters).

The distance the input material will be travelling from the current timestep ($t_i$) is calculated by adding the process speeds ($x_n$) at the current and future timesteps:

$$\sum_{j=i}^{k_i} x_{n,t_j}$$

In the above equation, $x_{n,tj}$ represents the process speed at timestep $t_j$ and $k_i$ represents the number of timesteps that are used for calculating the distance at timestep i. For example, if k=10, then the formula represents the distance travelled by the material in 10 timesteps.

If the time resolution of the data and the unit time of the process speed ($x_n$) are different, then the summation value is multiplied by a resolution factor (R) to compensate for the difference. This distance travelled by the material is compared with D. The variables R, D and $x_n$ are known and the timestep, k, is derived such that the total distance travelled by the material in the process is equal to D. If the material is added into the process at time $t_i$, the time it takes to reach the end of the process, $t_k$ can be approximated by satisfying equation (1):

$$R\sum_{j=1}^{k_i} x_{n,t_j} - D \cong 0, R = t_2 - t_1 \qquad (1)$$

$k_i$ needs to be calculated for each timestep and the aligned target, $y_{aligned,ti}$, is given by equations (2) and (3):

$$\text{latency}_i = k_i - i \qquad (2)$$

$$y_{aligned,t_i} = y_{t_{i+latency_i}} = y_{k_i} \qquad (3)$$

The dataset, after alignment with an example of D=0.05 and R=1 is shown in Table 2; the value for k is calculated for every timestep and the $y_{aligned}$ is set accordingly

TABLE 2

| Time | $x_1$ | $x_2$ | . . . | $x_n$ (Process Speed) | y | k | latency | $y_{aligned}$ ($y_{k_t}$) |
|---|---|---|---|---|---|---|---|---|
| $t_1$ | 0.10 | −0.31 | . . . | 0.02 | 1.1 | 3 | 2 | 0.8 ($y_{t_3}$) |
| $t_2$ | 0.22 | 0.20 | . . . | 0.01 | 1.2 | 4 | 2 | 0.7 ($y_{t_4}$) |
| $t_3$ | 0.10 | −0.31 | | 0.02 | 0.8 | 5 | 2 | 0.2 ($y_{t_5}$) |
| $t_4$ | 0.22 | 0.20 | | 0.02 | 0.7 | 7 | 3 | −0.5 ($y_{t_7}$) |
| $t_5$ | 0.10 | −0.31 | | 0.01 | 0.2 | 8 | 3 | −1.0 ($y_{t_8}$) |
| $t_6$ | 0.22 | 0.20 | | 0.01 | 0.0 | 9 | 3 | −0.5 ($y_{t_9}$) |

TABLE 2-continued

| Time | $x_1$ | $x_2$ | ... | $x_n$ (Process Speed) | y | k | latency | $y_{aligned}$ ($y_{k_t}$) |
|---|---|---|---|---|---|---|---|---|
| $t_7$ | 0.10 | −0.31 | | 0.01 | −0.5 | 11 | 4 | −0.3 ($y_{t_{11}}$) |
| $t_8$ | 0.22 | 0.20 | | 0.02 | −1.0 | 12 | 4 | −0.2 ($y_{t_{12}}$) |
| ... | ... | ... | ... | ... | ... | ... | ... | ... |
| $t_m$ | 0.22 | 0.20 | ... | ... | 0.4 | Not Applicable | Not Applicable | Not Applicable |

Many variations of the alignment are possible.

In some embodiments, if the process has a constant speed (i.e. $x_n$ being constant at all time points), the latency need not be calculated at every timestep but can be calculated only once and applied for all the instances of data.

Table 3, based on Table 2, provides an example of setting up memory for one of the process variables, $x_2$, with a memory step of h. This process is repeated for each of the selected process variable (or feature). The list of features that needs memory and the memory steps can be selected based on domain knowledge.

TABLE 3

| Time | $x_1$ | $x_2$ | ... | $x_n$ (Process Speed) | $x_{2, t_{l-1}}$ | $x_{2, t_{l-2}}$ | ... | $x_{2, t_{l-h}}$ | $y_{aligned}$ |
|---|---|---|---|---|---|---|---|---|---|
| $t_1$ | −0.30 | 0.10 | ... | 0.02 | — | — | ... | ... | 0.8 |
| $t_2$ | 0.20 | 0.22 | ... | 0.01 | 0.10 | — | ... | ... | 0.7 |
| $t_3$ | −0.35 | 0.77 | ... | 0.02 | 0.22 | 0.10 | ... | ... | 0.2 |
| $t_4$ | 0.23 | 0.74 | ... | 0.02 | 0.77 | 0.22 | ... | ... | −0.5 |
| $t_5$ | −0.45 | 0.24 | ... | 0.01 | 0.74 | 0.77 | ... | ... | −1.0 |
| $t_6$ | 0.55 | 0.28 | ... | 0.01 | 0.24 | 0.74 | ... | ... | −0.5 |
| $t_7$ | −0.61 | 0.18 | ... | 0.01 | 0.28 | 0.24 | ... | ... | −0.3 |
| $t_8$ | 0.70 | 0.21 | ... | 0.02 | 0.18 | 0.28 | ... | ... | −0.2 |
| ... | ... | ... | ... | ... | ... | ... | ... | ... | ... |
| $t_m$ | 0.40 | 0.55 | ... | ... | ... | ... | ... | ... | Not Applicable |

In some embodiments, if the distance between the start and end of the process is not known (i.e. D is not known), then $y_{aligned}$ is first calculated for a range of distance values between reasonable minimum and maximum values. Then the total distance, latency and $y_{aligned}$ are chosen based on the one where $y_{aligned}$ correlates more with one or more variables collected at the input region of the process.

In some embodiments, if the resolution, R is a not constant or in other words, if the data is collected at inconsistent time intervals, then Eq (1) has to be reformulated as follows:

$$\left(\sum_{j=i}^{k_i} x_{n,t_j} * R_j\right) - D \cong 0, R_j = t_j - t_{j-1}$$

The alignment method is applicable to any timeseries data in which there is a latency between input variables and targets.

Setup of Memory for Selected Process Variables

In an industrial process, the target (that is to be predicted) may not only be affected by the information at the current timestep, but also the previous timesteps. For example, the temperature change in a process is not just based on the temperature at the current timestep, but also based on the temperature at a previous timestep and the previous rate of change. In some embodiments, certain process variables can trend in a similar way based on the previous values—either by design or by the operator. In cases like these, the trends of the process variables at the previous timesteps would provide a helping hand to the machine learning model to forecast the targets more accurately. Incorporating the data of process variables at previous timesteps at the current timestep is defined as "memory". The number of steps used for memory is defined as "memory steps".

Many variations of memory setup are possible.

In some embodiments, if domain knowledge is not available, all of the process variables can be used for setting up memory and the memory steps can be set to a maximum value based on the machine learning model or computational limitations. Selected features are often used so that the total number of process variables is not more than the model learning capacity of the machine learning algorithm and model training does not require more computational power than what is available.

In some embodiments, memory steps can be selected for each feature individually rather than having a common memory step for all features as described above.

In some embodiments, where domain information is not available, memory steps and the list of selected features can be obtained by performing a temporal correlation analysis. The correlation analysis is performed between target and features at different timesteps to understand if adding memory provides required correlation value with respect to the target. Based on this analysis, the features and memory steps are decided.

Memory setup can be applied to any process having a timeseries data where the target at a current timestep is affected by the data at previous timesteps.

Clustering for Process Variations

An industrial process undergoes many variations in terms of the physics or in other words, operating states, over a short spans of time. An example includes a process that runs in a high fuel-efficiency operating state during early morning and a low efficiency state during evening. These variations might be due to human factors, environmental changes or control variable settings. It is difficult for a single machine learning model to accurately learn to predict the target for all the different operating states of the process. It is beneficial to separate the data into individual sets based on operating states or data distribution using unsupervised machine learning. This type of machine learning models can be used to cluster the data into individual set based on the variations within in such a way that each timestep of data is associated with a cluster. After clustering and sub-setting the data into individual clusters, individual machine learning models are trained on each cluster of dataset, to predict the target.

Figure 2:
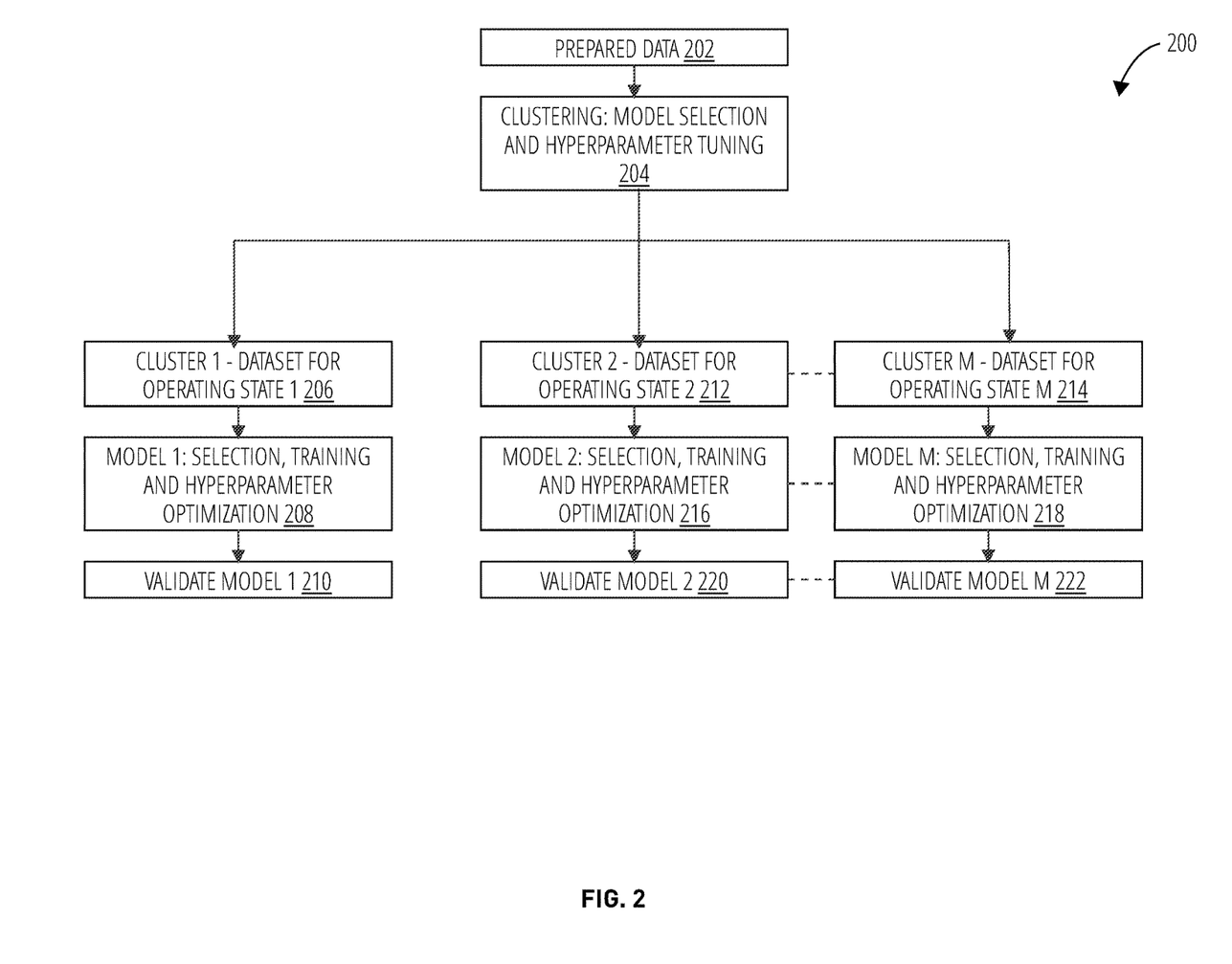
FIG. 2 illustrates a clustering process 200 in accordance with one embodiment.

An embodiment of the process is shown in FIG. 2. Clustering process 200 operates on prepared data (i.e. following alignment and memory setup) at the first step 202. In general, clustering is performed by selecting a model and tuning one or more hyperparameters (box 204). The number of clusters can be any number; FIG. 2 shows the procedure for 'M' clusters. For each cluster, the procedure comprises: selecting the dataset for the relevant cluster (boxes 206, 212, and 214); selecting a machine learning model for each cluster, training the model, and optimizing one or more hyperparameters (boxes 208, 216 and 218); and then validating the model (boxes 210, 220 and 222).

Clustering is unsupervised machine learning technique which tries to understand the similarity of the data points with respect to distances or other metrics based on the type of clustering algorithm used. There are several types of clustering algorithms that calculate the similarity of data in different ways, such as using distances, distribution of data, etc.

Some examples of clustering algorithms are K-Means, Mean-Shift Clustering, Gaussian Mixture Models, Hierarchical Clustering, etc. Each algorithm has anywhere from a few to several hyperparameters. In some embodiments, distance-based clustering algorithms can be used.

Examples of supervised machine learning algorithms are Linear Regression, Logistic Regression, Random Forests, Support Vector Machines and neural network models. Each machine learning algorithm has anywhere from few to several hyperparameters.

Many variations of clustering are possible.

In some embodiments, the clustering method can be replaced with a rule-based method in which the data can be separated into different operating states based on rules derived from knowledge of the domain.

In some embodiments, instead of sub-setting the data, the cluster type can be added as a state variable and one supervised machine learning model is used for training. This can help the model transfer the learnings across different clusters.

In some embodiments, any cluster with a lower subset of data based on a user defined threshold, can be discarded as abnormal or anomaly data.

In some embodiments, instead of deterministically finding the cluster type (called "hard clustering"), the cluster type can be stochastically found as probabilities (called "soft clustering"). This information can be used as a process variable while supervising machine learning to predict a target.

Since one model is used for each cluster, predictions for different operating states can be isolated based on good model performance and bad performance. This can help in understanding the operating states where the model performance is good versus bad.

In addition, the clustering method can be applied to any industrial process or time series data in which the dataset can be divided before training a model to predict a target.

Deployment of Model for Real-Time Predictions

After training the model using the aforementioned method (i.e. step 110 of FIG. 1), the model and the data preparation methods can be deployed into production for real-time predictions. For each timestep of real-time data, the deployed package can predict the target. A package is defined as a combination of methods that perform one or more actions. The production methods are divided into two packages. A data package can be used for the preprocessing of raw data. A model package may be used for the cluster model prediction and the $y_{aligned}$ predictions.

Figure 3:
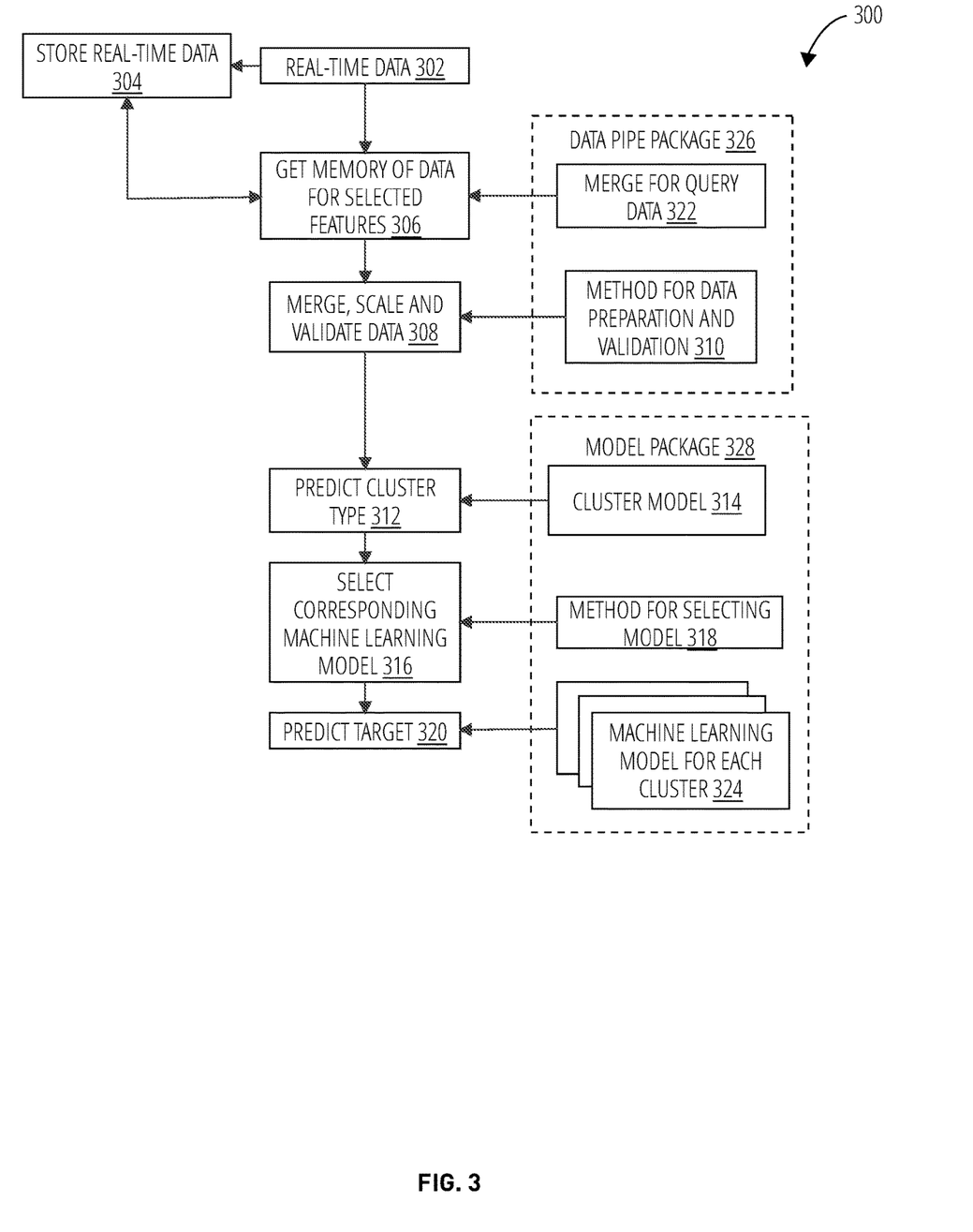
FIG. 3 illustrates application to real time data in accordance with one embodiment.

FIG. 3 illustrates an embodiment of process 300 in which a data pipe package 326 and a model package 328 work in sequence for target predictions.

At 302, real time data of an industrial process is saved (304); storage can be in a database.

As soon as an instance of real-time data is streamed, the data pipe package 326 first queries the data storage 304 using the current timestamp, the list of features selected for memory and the memory steps at 306. This will be merged with the current timestep data, scaled and validated at 308 for sending the data into a model package 328.

The prepared data (step 308) is passed to the cluster model to predict the cluster number of the current instance of data (step 312). Based on the predicted cluster type, the corresponding machine learning model (at 316) is fed with the data to predict the target (at 320).

Figure 4:
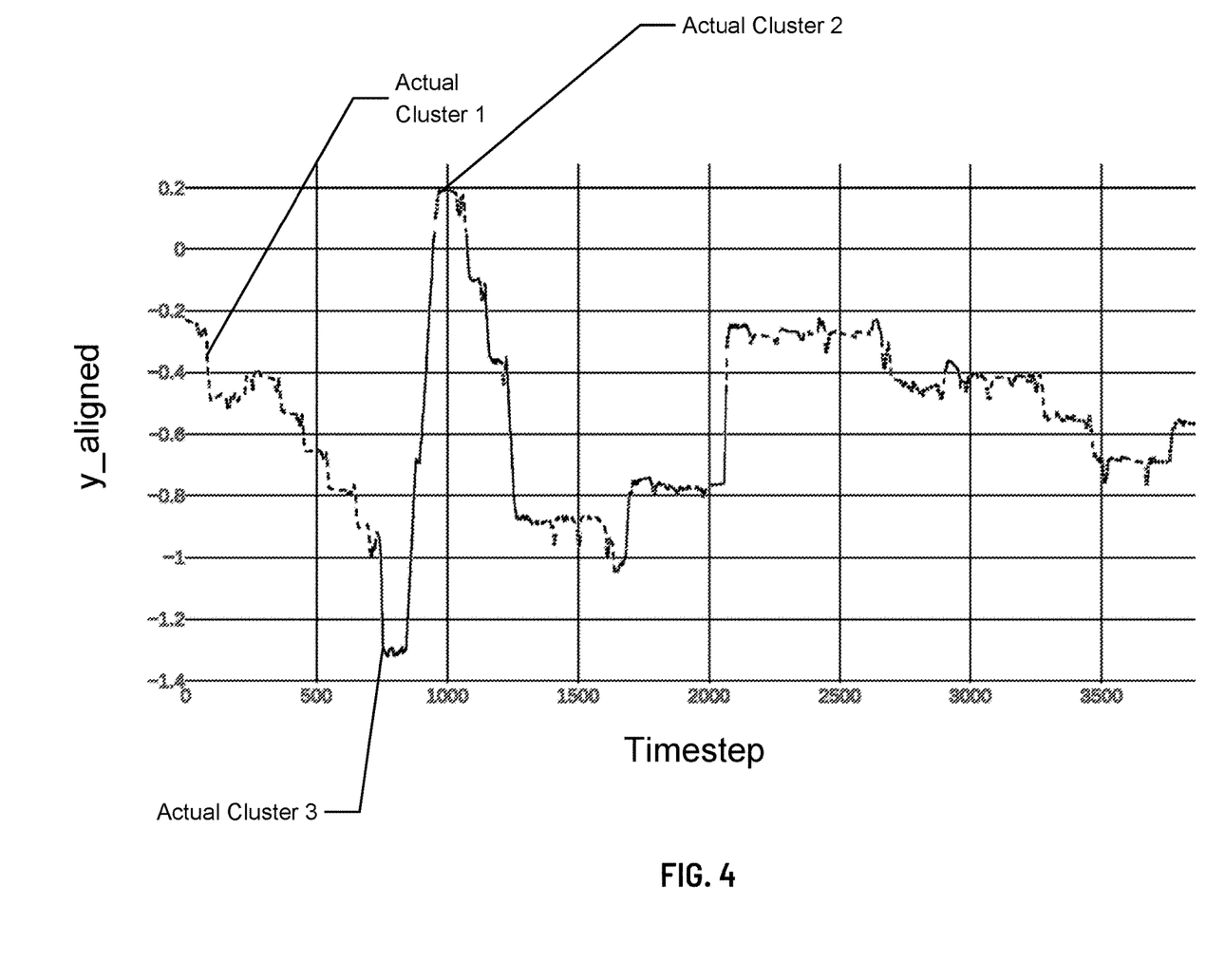
FIG. 4 illustrates clustering of real time data and scaled data of an aligned target in accordance with one embodiment.

FIG. 4 illustrates the actual $y_{aligned}$ value with respect to each timestep after the incoming real-time data has been ingested by the cluster model to find out the appropriate cluster for each type (i.e. step 312) of FIG. 3. For example, in FIG. 4, from timestep t=0 about t=700, the data points fall into cluster 1; from timestep t=700 about t=900, the data points fall into cluster 3; from timestep t=900 about t=1100, the data points fall into cluster 2, and so on.

Figure 5:
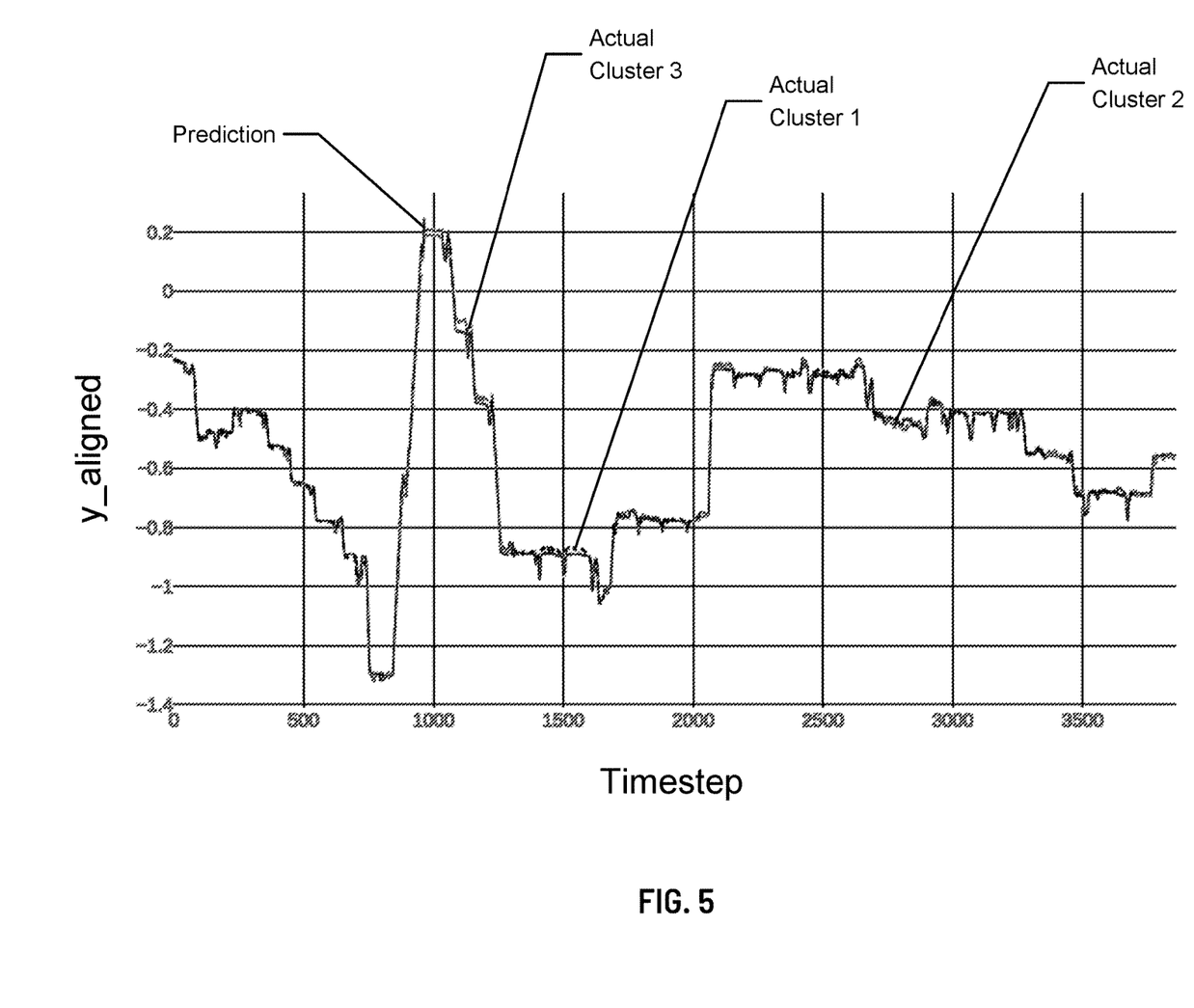
FIG. 5 illustrates target prediction in relation to clustering of real time data shown in FIG. 4.

In accordance with FIG. 3, once the data points are clustered (step 312), the appropriate machine learning model is selected and applied to each cluster (step 314) in order to predict the target, $y_{aligned}$ (step 316). The predicted value of $y_{aligned}$ is shown in FIG. 5, after the appropriate machine learning model is applied to each cluster.

Figure 6:
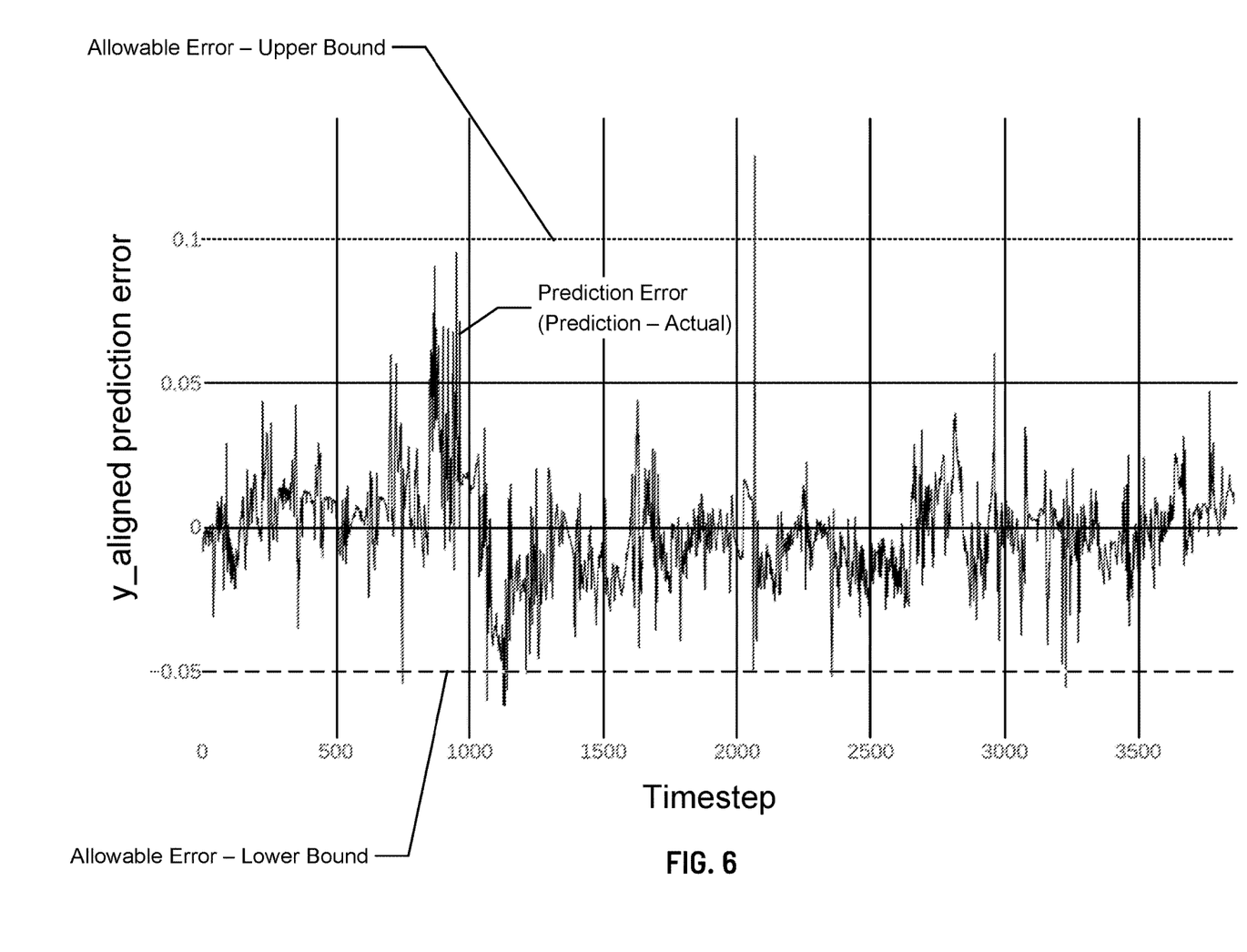
FIG. 6 illustrates the error between the predicted and actual value of $y_{aligned}$ in relation to real time data shown in FIG. 5.

FIG. 6 shows the error between the predicted and actual value of $y_{aligned}$, in addition to allowable error limits for the machine learning model prediction error.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand alone program, a component, or other unit suitable for use in a computing environment. A computer program can be deployed to be executed on one computer or can be deployed on multiple computers that are located at one site or distributed across multiple sites and interconnected by a communication network. As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices. The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU). Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive. Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry. To provide for interaction with a user, embodiments of the subject matter described herein can be implemented on a computer having a display device for displaying information to the user and input devices by which the user can provide input to the computer (e.g. a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser. Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN"). The computing system can include clients and servers. A client and server are generally remote from each other and typically interact through a communication network. The relationship of client and server arises by virtue of computer programs running on the respective computers and having a client-server relationship to each other.

Figure 7:
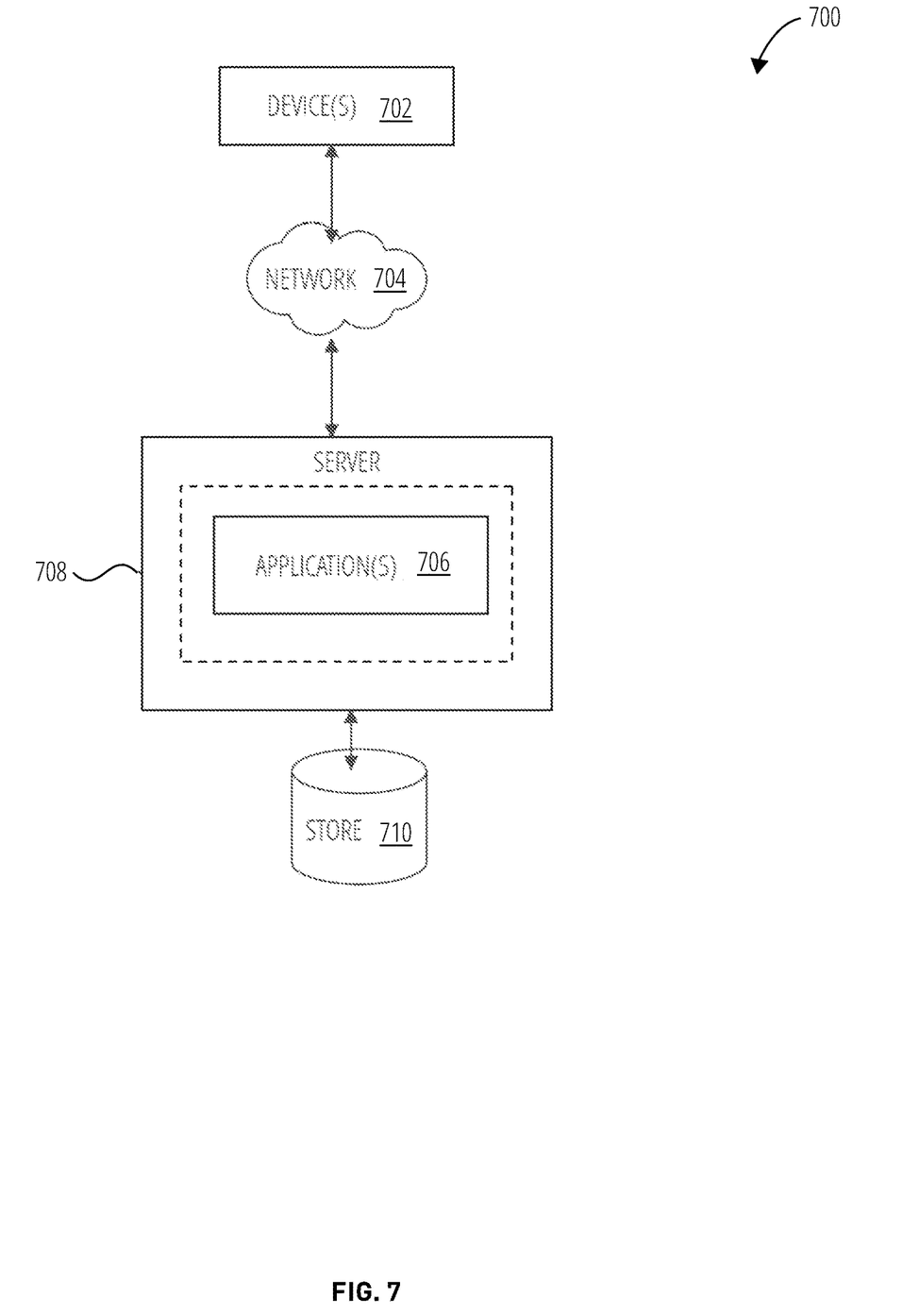
FIG. 7 illustrates a simplified block diagram of a computing system in which various embodiments may be practiced.

FIG. 7 illustrates a simplified block diagram of a computing system in which various embodiments may be practiced. The computing system may include number of device(s) 702 (for example, a computing device, a tablet computing device, a mobile computing device, etc.). The device(s) 702 may be in communication with a distributed computing network 704. A server 708 is in communication with the device(s) 702 over the network 704. The server 708 may store one or more application(s) 706 which may perform routines as described above. The server 708 may provide the one or more application(s) 706 to clients. As one example, the server 708 may be a web server providing one or more application(s) 706 over the web. The server 708 may provide the one or more application(s) 706 over the web to clients through the network 704. Any of the computing device(s) 702 may obtain content from the store 710.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products. Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
obtaining historical data of a process, the historical data comprising: one or more process variables; a process speed; and a target variable;
pre-processing the historical data to provide a pre-processed data set, the pre-processing comprising aligning the target variable to the one or more process variables to provide an aligned dataset; and
training a machine learning model on the pre-processed dataset.

2. The method of claim 1, wherein aligning the target variable is based on: a resolution factor for the process speed, a distance of the process and the process speed.

3. The method of claim 1, wherein after aligning the target variable, pre-processing further comprises at least one of:
incorporating a memory of one or more selected features of the process into the pre-processed data set; and
partitioning the aligned dataset into a plurality of sub-datasets, wherein a separate machine learning model is trained on each sub-dataset of the plurality of sub-datasets;
and wherein if incorporating memory and partition are performed:
the aligned dataset first incorporates memory and is then partitioned into sub-datasets; or
each sub-dataset incorporates the memory of one more selected features.

4. The method of claim 3, wherein a clustering algorithm is used to partition the dataset into clusters of sub-datasets.

5. The method of claim 3, wherein the memory includes a plurality of memory steps; and the memory steps and selected features are determined by domain knowledge or a correlation analysis between the target variable and features at different timesteps.

6. The method of claim 1, wherein a rule-based method is used to partition the dataset into sub-datasets, the rule-based method derived from domain knowledge.

7. A computing system, the computing system comprising:
a processor; and
a computer memory storing instructions that, when executed by the processor, configure the system to:
obtain historical data of a process, the historical data comprising: one or more process variables; a process speed; and a target variable;
pre-process the historical data to provide a pre-processed data set, the pre-processing comprising aligning the target variable to the one or more process variables to provide an aligned dataset; and
train a machine learning model on the pre-processed dataset.

8. The computing system of claim 7, wherein aligning the target variable is based on: a resolution factor for the process speed, a distance of the process and the process speed.

9. The computing system of claim 7, wherein the system is further configured to, after aligning the target variable:
incorporate a memory of one or more selected features of the process into the pre-processed data set; and/or
partition the aligned dataset into a plurality of sub-datasets, wherein a separate machine learning model is trained on each sub-dataset of the plurality of sub-datasets;
and wherein if incorporating memory and partition are performed:
the aligned dataset first incorporates memory and is then partitioned into sub-datasets; or
each sub-dataset incorporates the memory of one more selected features.

10. The computing system of claim 9, wherein a clustering algorithm is used to partition the dataset into clusters of sub-datasets.

11. The computing system of claim 9, wherein the memory includes a plurality of memory steps; and the memory steps and selected features are determined by domain knowledge or a correlation analysis between the target variable and features at different timesteps.

12. The computing system of claim 7, wherein a rule-based method is used to partition the dataset into sub-datasets, the rule-based method derived from domain knowledge.

13. A non-transitory computer-readable storage medium, the computer-readable storage medium including instructions that when executed by a computer, cause the computer to:
obtain historical data of a process, the historical data comprising: one or more process variables; a process speed; and a target variable;
pre-process the historical data to provide a pre-processed data set, the pre-processing comprising aligning the target variable to the one or more process variables to provide an aligned dataset; and
train a machine learning model on the pre-processed dataset.

14. The computer-readable storage medium of claim 13, wherein aligning the target variable is based on: a resolution factor for the process speed, a distance of the process and the process speed.

15. The computer-readable storage medium of claim 13, wherein the instructions that when executed by the computer, further cause the computer to, after aligning the target variable:
incorporate a memory of one or more selected features of the process into the pre-processed data set; and/or
partition the aligned dataset into a plurality of sub-datasets, wherein a separate machine learning model is trained on each sub-dataset of the plurality of sub-datasets;
and wherein if incorporating memory and partition are performed:
the aligned dataset first incorporates memory and is then partitioned into sub-datasets; or
each sub-dataset incorporates the memory of one more selected features.

16. The computer-readable storage medium of claim 15, wherein a clustering algorithm is used to partition the dataset into clusters of sub-datasets.

17. The computer-readable storage medium of claim 15, wherein the memory includes a plurality of memory steps; and the memory steps and selected features are determined by domain knowledge or a correlation analysis between the target variable and features at different timesteps.

18. The computer-readable storage medium of claim 13, wherein a rule-based method is used to partition the dataset into sub-datasets, the rule-based method derived from domain knowledge.

* * * * *